United States Patent [19]

Rim

[11] Patent Number: 5,757,910

[45] Date of Patent: May 26, 1998

[54] APPARATUS FOR PREVENTING ILLEGAL COPYING OF A DIGITAL BROADCASTING SIGNAL

[75] Inventor: Chai Yeol Rim, Seoul, Rep. of Korea

[73] Assignee: Goldstar Co., Ltd., Seoul, Rep. of Korea

[21] Appl. No.: 661,661

[22] Filed: Jun. 11, 1996

Related U.S. Application Data

[63] Continuation of Ser. No. 222,529, Apr. 4, 1994, abandoned.

[30] Foreign Application Priority Data

| Apr. 6, 1993 | [KR] | Rep. of Korea | 5727/1993 |
| Jan. 27, 1994 | [KR] | Rep. of Korea | 1498/1994 |
| Mar. 2, 1994 | [KR] | Rep. of Korea | 4024/1994 |

[51] Int. Cl.$^6$ .................................................. H04N 7/169
[52] U.S. Cl. ........................... 380/5; 380/14; 380/15; 380/20; 348/439
[58] Field of Search .............................. 380/5, 15, 14, 380/20; 360/60; 348/434

[56] References Cited

U.S. PATENT DOCUMENTS

| 4,594,609 | 6/1986 | Romao et al. | 380/15 |
| 4,907,093 | 3/1990 | Ryan | 380/5 X |
| 4,945,563 | 7/1990 | Horton et al. | 380/5 |
| 5,034,981 | 7/1991 | Leonard et al. | 380/5 |
| 5,113,441 | 5/1992 | Hasada | 380/15 |
| 5,177,618 | 1/1993 | Dunlap et al. | |
| 5,182,771 | 1/1993 | Munich et al. | 380/5 |
| 5,384,598 | 1/1995 | Rodriguez et al. | 380/439 X |

*Primary Examiner*—Gilberto Barron, Jr.

[57] ABSTRACT

An apparatus for preventing illegal copying of a digital broadcasting signal, comprises a transmission section for generating a copy prevention signal to determine a display time of each field of a digital video signal on a screen, compressing the digital video signal and the copy prevention signal, modulating the compressed copy prevention signal and digital video signal into the digital broadcasting signal and transmitting the digital broadcasting signal through a transmitting antenna, and a reception section for receiving the digital broadcasting signal transmitted from the transmission section through a receiving antenna, demodulating the received digital broadcasting signal into the digital video signal, expanding the demodulated digital video signal, detecting the copy prevention signal from the expanded digital video signal, generating horizontal and vertical synchronous signals in response to the detected copy prevention signal and displaying the expanded digital video signal on the screen synchronously with the generated horizontal and vertical synchronous signals.

22 Claims, 7 Drawing Sheets

APPARATUS FOR PREVENTING ILLEGAL COPYING OF A DIGITAL BROADCASTING SIGNAL

This application is a continuation of application Ser. No. 08/222,529 filed on Apr. 4, 1994, now abandoned.

BACKGROUND OF THE INVENTION

1. Field of the Invention

The present invention relates in general to transmission and reception of a digital broadcasting signal, and more particularly to an apparatus for preventing copying of the digital broadcasting signal by transmitting and receiving a copy prevention signal, which is capable of preventing a viewer from copying the digital broadcasting signal using a recorder without permission.

2. Description of the Background Art

Figure 1:
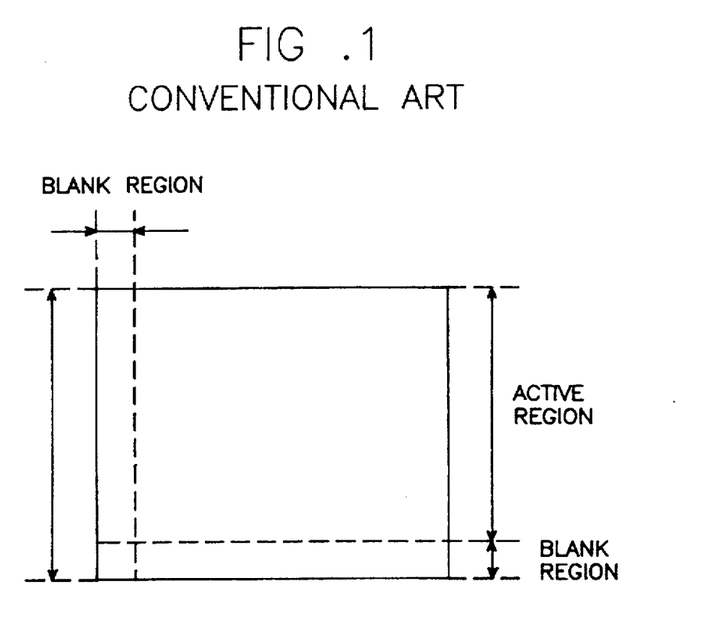
FIG. 1 is a view illustrating a video signal of one frame of a general analog broadcasting signal.

As shown in FIG. 1, an analog broadcasting signal of an existing broadcasting type such as a NTSC broadcasting type includes an active region of 240 horizontal scanning lines, which can actually be watched by a viewer, and a blank region of 22.5 horizontal scanning lines, in which horizontal and vertical synchronous signals are placed.

Figure 2:
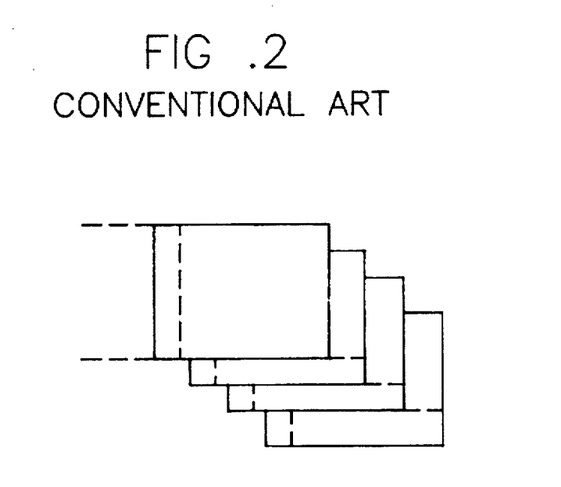
FIG. 2 is a view illustrating a copy prevention transmission format of the analog broadcasting signal in FIG. 1.

For the purpose of preventing the viewer from copying the analog broadcasting signal of the NTSC broadcasting type without permission, the blank region is transmitted from a broadcasting station with the number of the horizontal scanning lines varied as shown in FIG. 2. In this case, the number of the horizontal scanning lines in the blank region is varied every field. This variation has the effect of intentionally varying a display time of each field on a screen.

Noticeably, the viewer cannot recognize the varied display time because the active region of the analog broadcasting signal is transmitted from the broadcasting station with the number of the horizontal scanning lines fixed.

Generally, in a recorder, a rotatable control head is provided to detect the horizontal synchronous signals from the analog broadcasting signal transmitted from the broadcasting station. The transmitted analog broadcasting signal is recorded on a tape on the basis of the detected horizontal synchronous signals. By the way, upon receiving the analog broadcasting signal in which the number of the horizontal scanning lines is different every field as mentioned above, the recorder cannot detect the horizontal synchronous signals from the received analog broadcasting signal, since the horizontal synchronous signals representing start points of the horizontal scanning lines are different in number for every field. As a result, the analog broadcasting signal cannot be recorded on the tape. Namely, it is impossible to copy the analog broadcasting signal.

On the other hand, for the purpose of preventing the viewer from watching a digital broadcasting signal without permission, the digital broadcasting signal is scrambled and transmitted at the broadcasting station. In this case, the horizontal and vertical synchronous signals are not transmitted from the broadcasting station.

In a conventional apparatus for receiving the digital broadcasting signal transmitted from the broadcasting station, the blank region in which the horizontal and vertical synchronous signals are placed is generated and the transmitted digital broadcasting signal is descrambled. The descrambled digital broadcasting signal is processed synchronously with the horizontal and vertical synchronous signals generated by the receiving apparatus. The processed digital broadcasting signal is converted into an analog broadcasting signal and then displayed on a monitor.

However, it is difficult to prevent the viewer from copying the digital broadcasting signal without permission, because the copy prevention signal and the horizontal and vertical synchronous signals are not transmitted from the broadcasting station.

SUMMARY OF THE INVENTION

Therefore, the present invention has been made in view of the above problem, and it is an object of the present invention to provide an apparatus for preventing illegal copying of a digital broadcasting signal in which a copy prevention signal is transmitted from a broadcasting station together with a digital video signal to randomly vary a display time of each field on a screen. The transmitted copy prevention signal and the digital video signal are received, so that the digital broadcasting signal can be prevented from being copied without permission.

It is another object of the present invention to provide an apparatus for preventing copying of a digital broadcasting signal in which a different number of horizontal synchronous signals are generated for every field to vary a display time of each field on a screen, so that the digital broadcasting signal can be prevented from being copied without permission.

In accordance with one aspect of the present invention, there is provided an apparatus for preventing copying of a digital broadcasting signal, comprising transmission means for generating a copy prevention signal to determine a display time of each field of a digital video signal on a screen, compressing the digital video signal and the copy prevention signal, modulating the compressed copy prevention signal and digital video signal into the digital broadcasting signal and transmitting the digital broadcasting signal through a transmitting antenna; and reception means for receiving the digital broadcasting signal transmitted from said transmission means through a receiving antenna, demodulating the received digital broadcasting signal into the digital video signal, expanding the demodulated digital video signal, detecting the copy prevention signal from the expanded digital video signal, generating horizontal and vertical synchronous signals in response to the detected copy prevention signal and displaying the expanded digital video signal on the screen synchronously with the generated horizontal and vertical synchronous signals.

In accordance with another aspect of the present invention, there is provided an apparatus for preventing copying of a digital broadcasting signal, comprising demodulation means for demodulating the digital broadcasting signal transmitted from a broadcasting station into a digital video signal; descrambling means for descrambling the demodulated digital video signal from said demodulation means; video decoding means for expanding the descrambled digital video signal from said descrambling means; synchronous signal generation means for generating horizontal and vertical synchronous signals and inserting the generated horizontal and vertical synchronous signals into the expanded digital video signal from said video decoding means; and digital/analog conversion means for converting the resultant digital video signal from said synchronous signal generation means into an analog video signal and outputting the analog video signal to a monitor. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings which are given by way of illustration only, and thus are no limitative of the present invention, in which:

FIGS. 8A to 8F are waveform diagrams of signals from components in the synchronous signal generation circuit in FIG. 7;

FIGS. 10A to 10C are waveform diagrams of signals from components in the synchronous signal generation circuit in FIG. 9.

DETAILED DESCRIPTION OF THE PREFERRED EMBODIMENTS

Figure 3:
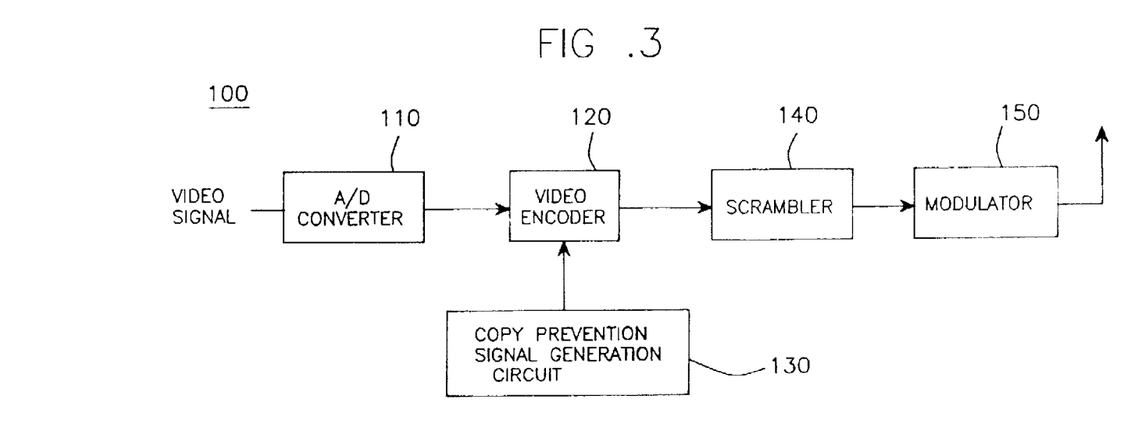
FIG. 3 is a block diagram of a transmission section in an apparatus for preventing copy of a digital broadcasting signal in accordance with an embodiment of the present invention.

Referring to FIG. 3, there is shown a block diagram of a transmission section 100 in an apparatus for preventing copying of a digital broadcasting signal in accordance with an embodiment of the present invention. As shown in this drawing, the transmission section 100 comprises an analog/digital (A/D) converter 110, a video encoder 120, a copy prevention signal generation circuit 130, a scrambler 140 and a modulator 150.

The transmission section 100 is adapted to convert an analog video signal inputted thereto into a digital video signal, generate a copy prevention signal to prevent illegal copying of the digital video signal and compress the digital video signal and the copy prevention signal. The copy prevention signal functions to determine a display time of the digital video signal on a screen.

Then, the transmission section 100 scrambles the compressed copy prevention signal and digital video signal and modulates the scrambled copy prevention signal and digital video signal into the digital broadcasting signal. Subsequently, the transmission section 100 transmits the digital broadcasting signal through a transmitting antenna.

Figure 4:
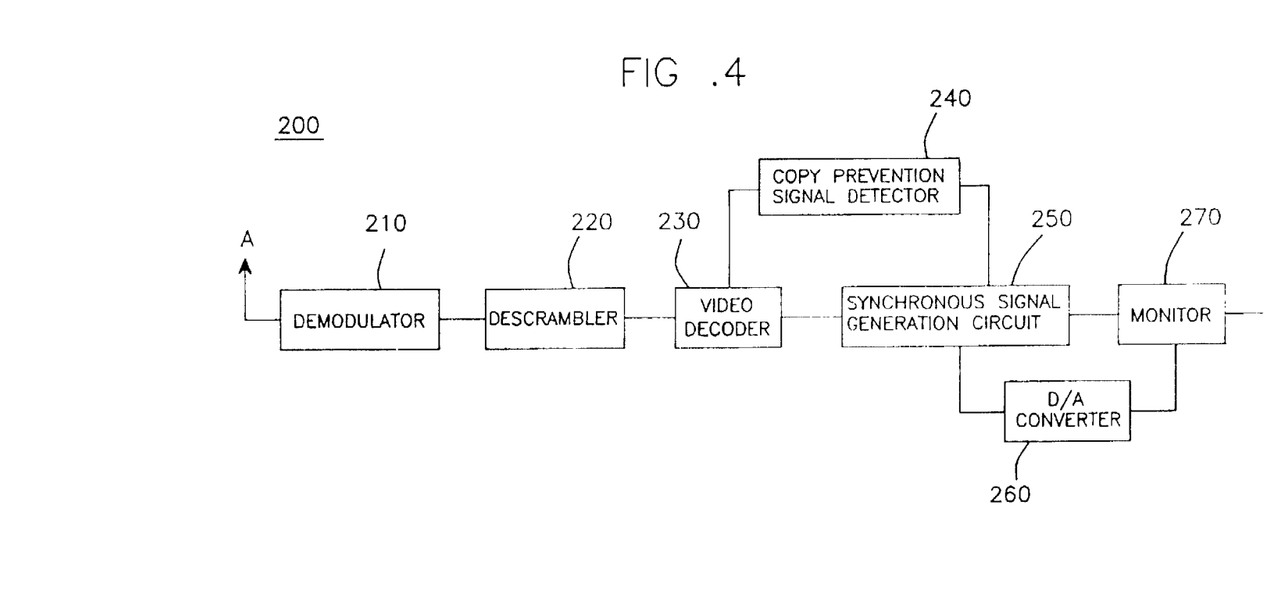
FIG. 4 is a block diagram of a reception section in the apparatus for preventing the copy of the digital broadcasting signal in accordance with the embodiment of the present invention.

Referring to FIG. 4, there is shown a block diagram of a reception section 200 in the apparatus for preventing the copying of the digital broadcasting signal in accordance with the embodiment of the present invention. As shown in this drawing, the reception section 200 comprises a demodulator 210, a descrambler 220, a video decoder 230, a copy prevention signal detector 240, a synchronous signal generation circuit 250, a digital/analog (D/A) converter 260 and a monitor 270.

The reception section 200 is adapted to demodulate the digital broadcasting signal transmitted from the transmission section 100 into the digital video signal, expand the demodulated digital video signal, detect the copy prevention signal from the expanded digital video signal and generate horizontal and vertical synchronous signals in accordance with the detected copy prevention signal. Then, the reception section 200 inserts the generated horizontal and vertical synchronous signals into the expanded digital video signal and converts the resultant digital video signal into the analog video signal. Subsequently, the reception section 200 displays the analog video signal on a screen of the monitor 270.

Figure 5:
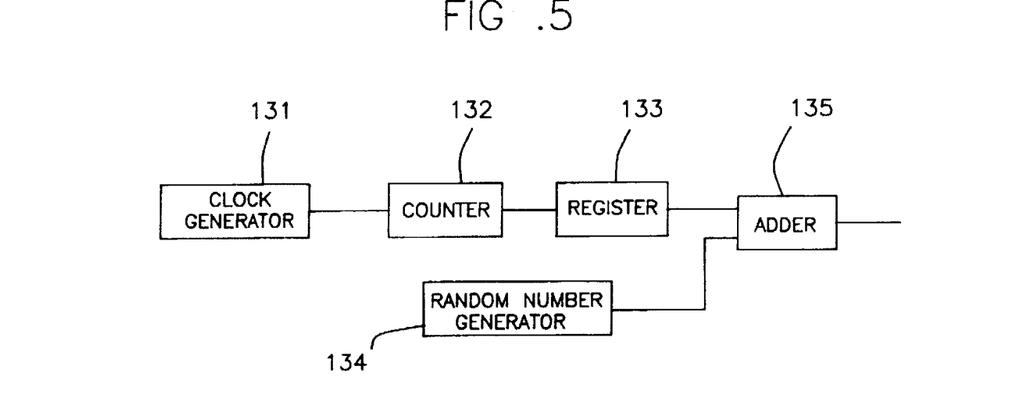
FIG. 5 is a detailed block diagram of a copy prevention signal generation circuit in the transmission section in FIG. 3.

Referring to FIG. 5, there is shown a detailed block diagram of the copy prevention signal generation circuit 130 of the transmission section 100 in FIG. 3. As shown in FIG. 5, the copy prevention signal generation circuit 130 includes a clock generator 131 for generating clock pulses from the input of the last one of the horizontal synchronous signals of one field until the input of the vertical synchronous signal of the subsequent field, a counter 132 for counting the clock pulses from the clock generator 131 for an interval between the adjacent horizontal and vertical synchronous signals, a register 133 for temporarily storing the counted value from the counter 132, a random number generator 134 for generating a random number, and an adder 135 for adding the counted value temporarily stored in the register 133 and the random number from the random number generator 134 and outputting the added value as the copy prevention signal to vary an interval between the last horizontal synchronous signal of one field and the vertical synchronous signal of the subsequent field.

The operation of the digital broadcasting signal copy prevention apparatus with the above-mentioned construction in accordance with the embodiments of the present invention will hereinafter be described in detail.

First, in the transmission section 100, the inputted analog video signal is converted into the digital video signal by the A/D converter 110 and then compressed by the video encoder 120.

In the copy prevention signal generation circuit 130, the clock pulses are generated by the clock generator 131 from the input of the last horizontal synchronous signal of one field until the input of the vertical synchronous signal of the subsequent field. The clock pulses from the clock generator 131 are counted by the counter 132 for an interval between the adjacent horizontal and vertical synchronous signals. The counted value from the counter 132 is temporarily stored in the register 133. The random number is generated by the random number generator 134 and then added to the counted value stored in the register 133 by the adder 135. As a result, the added value from the adder 135 is applied as the copy prevention signal which delays the time that the vertical synchronous signal is inputted after the input of the last horizontal synchronous signal of one field. The time delay is performed by an amount determined by the random number from the random number generator 134.

The copy prevention signal from the copy prevention signal generation circuit 130 determining the interval between the last horizontal synchronous signal of one field and the vertical synchronous signal of the subsequent field is compressed by the video encoder 120 together with the digital video signal from the A/D converter 110. The compressed copy prevention signal and digital video signal from the video encoder 120 are scrambled by the scrambler 140 and then modulated into the digital broadcasting signal by the modulator 150. As a result, the digital broadcasting signal is transmitted through the transmitting antenna from the transmission section 100, which may be placed in a broadcasting station.

Then, in the reception section 200, the digital broadcasting signal transmitted from the transmission section 100 is received through a receiving antenna A and demodulated into the digital video signal by the demodulator 210. The demodulated digital video signal from the demodulator 210 is descrambled into the original state by the descrambler 220 and then expanded by the video decoder 230. The expanded digital video signal from the video decoder 230 is applied to the copy prevention signal detector 240.

The copy prevention signal detector 240 detects the copy prevention signal of the expanded digital video signal from the video decoder 230 and outputs the detected copy prevention signal to the synchronous signal generation circuit 250, which also receives the expanded digital video signal from the video decoder 230. The synchronous signal generation circuit 250 generates horizontal and vertical synchronous signals for the expanded digital video signal from the video decoder 230 in accordance with to the detected copy prevention signal from the copy prevention signal detector 240.

Noticeably, 262 or 263 horizontal synchronous signals are generated after generation of the vertical synchronous signal in each field. A pixel of the digital video signal is inserted between the adjacent ones of the 262 or 263 horizontal synchronous signals. Upon the generation of the 262 or 263 horizontal synchronous signals of one field, the vertical synchronous signal of the subsequent field is generated after a time delay by the number of the clock pulses of the copy prevention signal. The delay time may be different for every field because the number of the clock pulses in the copy prevention signal may be different for every field.

Then, the digital video signal into which the horizontal and vertical synchronous signals are inserted is converted into an analog video signal by the D/A converter 260 and then displayed on the screen of the monitor 270.

Figure 6:
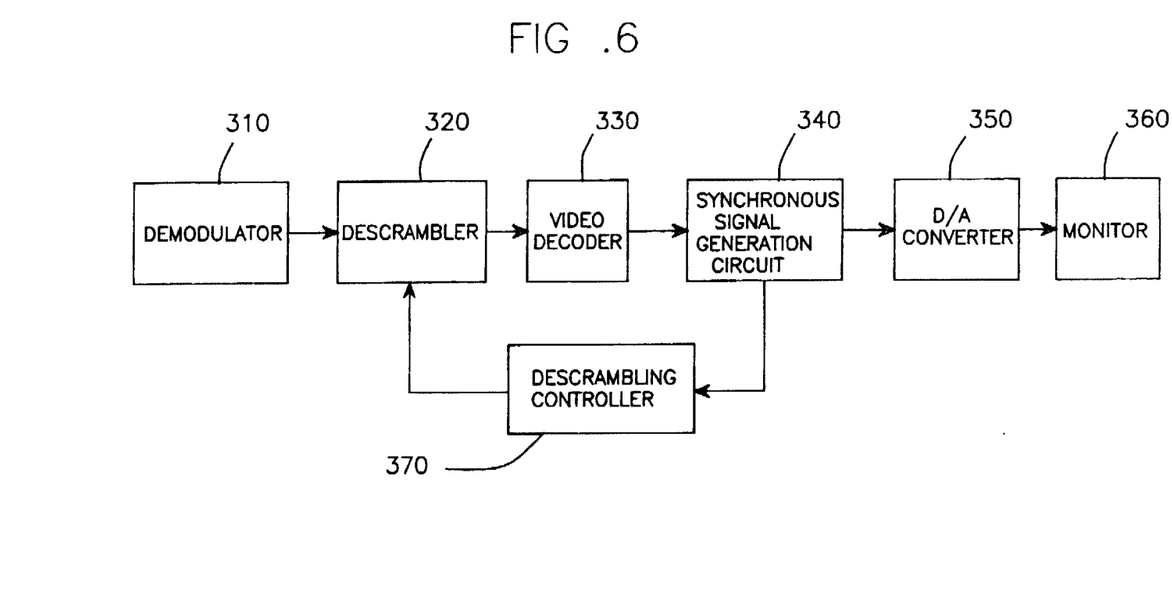
FIG. 6 is a block diagram of an apparatus for preventing copying of a digital broadcasting signal in accordance with an alternative embodiment of the present invention.

Referring to FIG. 6, there is shown a block diagram of an apparatus for preventing copying of a digital broadcasting signal in accordance with an another embodiment of the present invention. As shown in this drawing, the digital broadcasting signal copy prevention apparatus comprises a demodulator 310 for demodulating the digital broadcasting signal transmitted from the broadcasting station into a digital video signal, a descrambler 320 for descrambling the demodulated digital video signal from the demodulator 310, a video decoder 330 for expanding the descrambled digital video signal from the descrambler 320, a synchronous signal generation circuit 340 for generating horizontal and vertical synchronous signals and inserting the generated horizontal and vertical synchronous signals into the expanded digital video signal from the video decoder 330, a D/A converter 350 for converting the resultant digital video signal from the synchronous signal generation circuit 340 into an analog video signal and outputting the analog video signal to a monitor 360, and a descrambling controller 370 for controlling the descrambler 320 in response to a control signal from the synchronous signal generation circuit 340.

Figure 7:
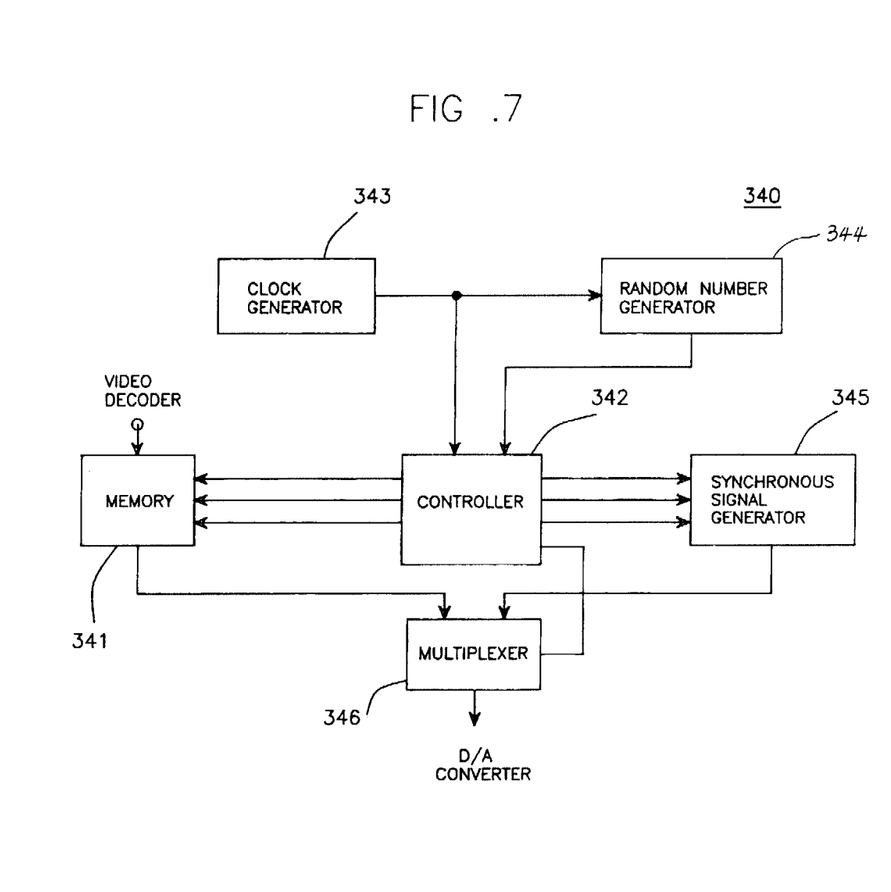
FIG. 7 is a detailed block diagram of an embodiment of a synchronous signal generation circuit in the apparatus shown in FIG. 6.

Referring to FIG. 7, there is shown a detailed block diagram of an embodiment of the synchronous signal generation circuit 340 in FIG. 6. As shown in FIG. 7, the synchronous signal generation circuit 340 comprises a memory 341 for storing the digital video signal from the video decoder 330, a clock generator 343 for generating clock pulses, a random number generator 344 for generating a random number, a controller 342 for adding the random number from the random number generator 344 to the number of the clock pulses from the clock generator 343, generating the vertical synchronous signal and the horizontal synchronous signals of the added number and controlling the output of pixels of the digital video signal stored in the memory 341, a synchronous signal generator 345 for mixing the vertical and horizontal synchronous signals from the controller 342 to generate a composite synchronous signal, and a multiplexer 346 for mixing the pixels of the digital video signal stored in the memory 341 with the composite synchronous signal from the synchronous signal generator 345 under the control of the controller 342.

The operation of the digital broadcasting signal copy prevention apparatus with the above-mentioned construction in accordance with the alternative embodiment of the present invention will hereinafter be described in detail with reference to FIGS. 8A to 8F which are waveform diagrams of the signals from the components in the synchronous signal generation circuit 340 in FIG. 7.

First, in the broadcasting station, only the digital video signal is compressed, modulated into a digital broadcasting signal and then transmitted in the conventional manner.

The digital broadcasting signal transmitted from the broadcasting station is demodulated into the digital video signal by the demodulator 310 and then descrambled into the original state by the descrambler 320. The descrambled digital video signal from the descrambler 320 is expanded by the video decoder 330 and then stored in the memory 341 in the synchronous signal generation circuit 340.

Figures 8A, 8B:
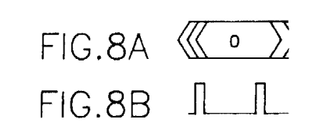
Figure 8A:
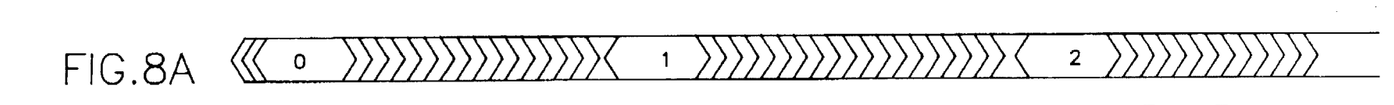
Figure 8B:
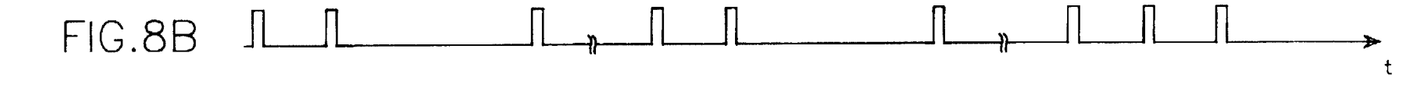
Figure 8C:
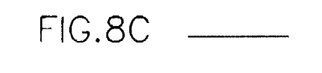

In the synchronous signal generation circuit 340, the clock pulses from the clock generator 343 as shown in FIG. 8A and the random number from the random number generator 344 are applied to the controller 342. The controller 342 adds the number of the clock pulses from the clock generator 343 to the random number from the random number generator 344 and then generates the horizontal synchronous signals of the added number as shown in FIG. 8B. Also, the controller 342 generates the vertical synchronous signal as shown in FIG. 8C. The vertical and horizontal synchronous signals from the controller 342 are applied to the synchronous signal generator 345.

Figure 8D:
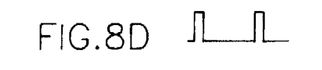
Figure 8E:
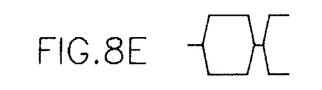

Upon receiving the vertical and horizontal synchronous signals from the controller 342, the synchronous signal generator 345 generates the composite synchronous signal as shown in FIG. 8D. Also, the pixels of the digital video signal stored in the memory 341 are outputted as shown in FIG. 8E under the control of the controller 342.

Figure 8F:
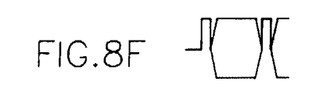

Then, the composite synchronous signal from the synchronous signal generator 345 and the pixels of the digital video signal from the memory 341 are selectively outputted as shown in FIG. 8F by the multiplexer 346 under the control of the controller 342.

The resultant digital video signal from the multiplexer 346 is converted into the analog video signal by the D/A converter 350 and then outputted to the monitor 360.

In this manner, because a randomly varying number of horizontal synchronous signals are further generated in accordance with the random number from the random number generator 344 in the synchronous signal generation circuit 340, the display time of each field on the screen of the monitor 360 is randomly delayed. Therefore, the illegal copying of the digital broadcasting signal can be prevented with the horizontal synchronous signals generated randomly.

Provided that the user removes the random number generator 344 in the synchronous signal generation circuit 340 to copy the digital broadcasting signal without permission, the controller 320 outputs a control signal indicative of the removal of the random number generator 344. The control signal from the controller 320 is applied to the descrambling controller 370, thereby to stop the operation of the descrambler 320. As a result, no picture is displayed on the screen of the monitor 360 as no digital video signal is descrambled. Therefore, the illegal copying of the digital broadcasting signal can be prevented.

Figure 9:
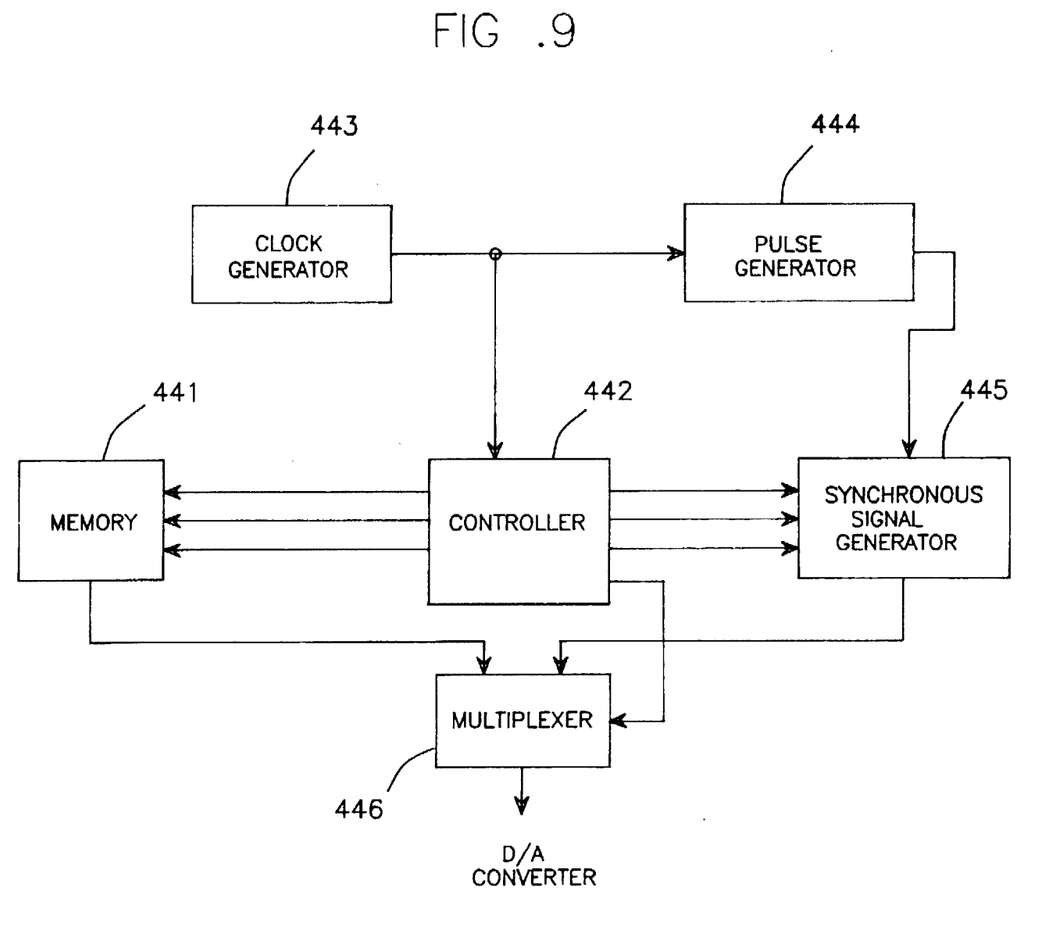
FIG. 9 is a detailed block diagram of an alternative embodiment of the synchronous signal generation circuit in the apparatus shown in FIG. 6.

Referring to FIG. 9, there is shown a detailed block diagram of an another embodiment of the synchronous signal generation circuit 340 in FIG. 6. In this embodiment, a memory 441, a controller 442, a clock generator 443, a synchronous signal generator 445 and a multiplexer 446 are substantially the same as the memory 341, the controller 342, the clock generator 343, the synchronous signal generator 345 and the multiplexer 346 in FIG. 7, respectively. But, a pulse generator 444 is provided instead of the random number generator 344 in FIG. 7. The pulse generator 444 is adapted to vary amplitudes of the clock pulses from the clock generator 443 and output the clock pulses with varying amplitudes as copy prevention signals to the synchronous signal generator 445.

Figure 10A:
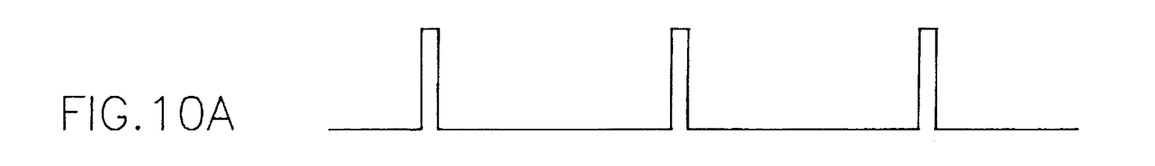

Now, the operation of the alternative embodiment of the synchronous signal generation circuit 340 with the above-mentioned construction in accordance with the present invention will be described in detail with reference to FIGS. 10A to 10C which are waveform diagrams of the signals from the components in the synchronous signal generation circuit 340 in FIG. 9.

As mentioned previously, the digital broadcasting signal transmitted from the broadcasting station is demodulated into the digital video signal by the demodulator 310 and then descrambled into the original state by the descrambler 320. The descrambled digital video signal from the descrambler 320 is expanded by the video decoder 330 and then stored in the memory 441 in the synchronous signal generation circuit 340.

In the synchronous signal generation circuit 340, the clock pulses from the clock generator 443 are applied to the controller 442 and the pulse generator 444. The controller 442 generates the vertical and horizontal synchronous signals in response to the clock pulses from the clock generator 443. The pulse generator 444 varies the amplitudes of the clock pulses from the clock generator 443 and outputs the clock pulses with varying amplitudes as the copy prevention signals. As a result, the copy prevention signals have pulses as shown in FIG. 10A. The copy prevention signals from the pulse generator 444 and the vertical and horizontal synchronous signals from the controller 442 are applied to the synchronous signal generator 445. In the synchronous signal generator 445, each of the copy prevention signals from the pulse generator 444 is interposed in the front of a corresponding one of the horizontal synchronous signals from the controller 442.

Figure 10B:
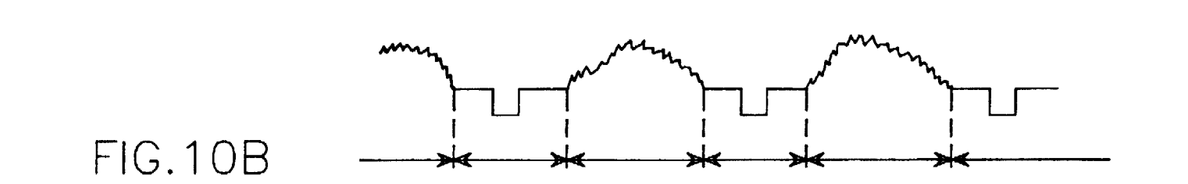
Figure 10C:
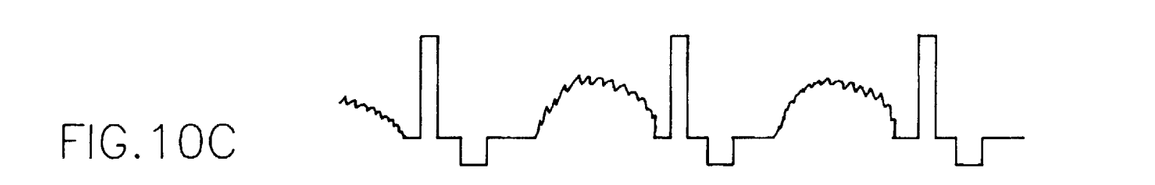

Also, the pixels of the digital video signal stored in the memory 441 are outputted as shown in FIG. 10B under the control of the controller 442. Then, the composite synchronous signal from the synchronous signal generator 445 and the pixels of the digital video signal from the memory 441 are selectively outputted as shown in FIG. 10C by the multiplexer 446 under the control of the controller 442.

In the case where the resultant digital video signal from the multiplexer 446 is applied to a recorder, an automatic gain controller in the recorder is operated to adjust a gain of the digital video signal. If the amplitudes of the copy prevention signals interposed in the digital video signal are large as shown in FIG. 10A, they are adjusted by adjusting a gain of the automatic gain controller. In this case, the amplitudes of the horizontal synchronous signals become considerably smaller than those of the copy prevention signals because of the adjusted gain of the automatic gain controller. As a result, the horizontal synchronous signals cannot be detected by a control head in the recorder. This has the effect of preventing the user from copying the digital broadcasting signal without permission.

As apparent from the above description, according to one embodiment of the present invention, a copy prevention signal is transmitted from the broadcasting station together with the digital video signal to determine the display time of each field on the screen, and the horizontal and vertical synchronous signals are generated according to the transmitted copy prevention signal. Therefore, the digital broadcasting signal can be prevented from being copied without permission.

Also, in the case where only the conventional digital broadcasting signal is transmitted from the broadcasting station, a different number of horizontal synchronous signals are generated for every field to randomly vary the display time of each field on the screen. Therefore, the digital broadcasting signal can be prevented from being copied without permission.

Furthermore, a copy prevention signal of the large amplitude is interposed in the front of each horizontal synchronous signal. Therefore, the illegal copying of the digital broadcasting signal can be prevented.

Moreover, in the case where the user removes the random number generator and stops the generation of the copy prevention signal to copy the digital broadcasting signal without permission, the operation of the descrambler is terminated when the stopping of the generation of the copy prevention signal is detected. Therefore, the illegal copying of the digital broadcasting signal can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for preventing copying of a digital broadcasting signal, comprising:

transmission means for generating a copy prevention signal as a function of a random number using a random number generator to vary randomly a display time of each field of a digital video signal on a screen, encoding the digital video signal and the copy prevention signal into encoded data, scrambling the encoded data, modulating the scrambled data into a digital broadcasting signal and transmitting the digital broadcasting signal, the transmission means including an adder for adding a predetermined value to the random number generated by said random number generator so as to generate the copy prevention signal; and reception means for receiving the digital broadcasting signal transmitted from said transmission means, demodulating the received digital broadcasting signal into the digital video signal, expanding the demodulated digital video signal, detecting the copy prevention signal from the expanded digital video signal, and generating horizontal and vertical synchronous signals in accordance with the detected copy prevention signal to display the expanded digital video signal synchronously with the generated horizontal and vertical synchronous signals.

2. An apparatus as set forth in claim 1, wherein said transmission means further includes:

a clock generator for generating clock pulses, and a counter for counting the clock pulses generated by said clock generator for a predetermined period to generate the predetermined value.

3. The apparatus as set forth in claim 2, wherein said predetermined period is an interval between adjacent horizontal and vertical synchronous signals.

4. An apparatus for preventing copying of a digital broadcasting signal, comprising:

demodulation means for demodulating the digital broadcasting signal transmitted from a broadcasting station into a demodulated digital video signal, the digital broadcasting signal having no copy prevention signal;

descrambling means for descrambling the demodulated digital video signal from said demodulation means;

video decoding means for expanding the descrambled digital video signal from said descrambling means; and synchronous signal generation means including a random number generator for generating horizontal synchronous signals as a function of a random number and vertical synchronous signals and inserting the generated horizontal and vertical synchronous signals into the expanded digital video signal from said video decoding means, so as to randomly vary a recording pattern of the descrambled digital video signal, said synchronous signal generating means including a controller for adding the random number generated by said random number generator to a number of pulses and generating the vertical synchronous signals and a number of the horizontal synchronous signals based on the added number.

5. The apparatus as set forth in claim 4, wherein said synchronous signal generation means further includes:

a clock generator for generating the number of pulses to which the random number is added.

6. The apparatus for preventing copying as set forth in claim 4, wherein said synchronous signal generation means further includes:

a memory for storing the digital video signal from said video decoding means;

a synchronous signal generator for mixing the vertical and horizontal synchronous signals from said controller to generate a composite synchronous signal; and a multiplexer for mixing pixels of the digital video signal stored in said memory with the composite synchronous signal from said synchronous signal generator under a control of said controller.

7. The apparatus for preventing copying of a digital broadcasting signal, as set forth in claim 4, wherein said controller generates a control signal when a removal of said random number generator is detected, so as to stop descrambling by said descrambling means.

8. An apparatus for preventing copying of a digital broadcasting signal, comprising:

demodulation means for demodulating the digital broadcasting signal transmitted from a broadcasting station into a demodulated digital video signal;

descrambling means for descrambling the demodulated digital video signal from said demodulation means;

video decoding means for expanding the descrambled digital video signal from said descrambling means;

synchronous signal generation means including a random number generator for generating horizontal synchronous signals as a function of a random number and vertical synchronous signals and inserting the generated horizontal and vertical synchronous signals into the expanded digital video signal from said video decoding means, so as to prevent copying of the digital broadcasting signal; and descrambling control means for stopping the operation of said descrambling means in response to a control signal generated to indicate that said random number generator has been removed for illegal copying of the digital broadcasting signal.

9. The apparatus as set forth in claim 8, wherein said synchronous signal generation means further includes:

a memory for storing the digital video signal from said video decoding means, a synchronous signal generator for mixing the vertical and horizontal synchronous signals to generate a composite synchronous signal, and a multiplexer for mixing pixels of the digital video signal stored in said memory with the composite synchronous signal from said synchronous signal generator.

10. An apparatus as set forth in claim 8, wherein said synchronous signal generation means includes:

a controller for adding the random number to a predetermined value and generating the horizontal synchronous signals based on an adding result.

11. The apparatus as set forth in claim 10, wherein said synchronous signal generation means further includes:

a clock generator for generating clock pulses, and a counter for counting the clock pulses for a predetermined period to generate the predetermined number.

12. An apparatus for preventing copying of a digital broadcasting signal, comprising:

copy prevention signal generation means for generating a copy prevention signal;

video encoding means for encoding a digital video signal and the copy prevention signal into encoded digital data;

scrambling means for scrambling the encoded digital data from said video encoding means;

modulation means for modulating the scrambled digital data from said scrambling means and transmitting the modulated digital data;

demodulation means for receiving the transmitted modulated digital data and demodulating the received digital data;

descrambling means for descrambling the demodulated digital data from said demodulation means;

copy prevention signal detection means for detecting a condition that a copy prevention signal is included in the descrambled data from said descrambling means; and varying means for generating, if the condition occurs, a signal to vary a recording pattern of the digital video signal.

13. The apparatus for preventing copying of a digital broadcasting signal as set forth in claim 12, where said varying means includes synchronous signal generation means for varying generation timing of a synchronous signal to vary the recording pattern of the digital video signal.

14. The apparatus for preventing copying of a digital broadcasting signal as set forth in claim 12, wherein said copy prevention signal generation means includes:

a random number generator for varying the recording pattern of the digital video signal as a function of a random number; and an adder for adding a predetermined value to the random number generated by said random number generator so as to generate the copy prevention signal.

15. The apparatus as set forth in claim 14, wherein said copy prevention signal generation means further includes:

a clock generator for generating clock pulses, and a counter for counting the clock pulses for a predetermined period to generate the predetermined value.

16. A method for preventing copying of a digital broadcasting signal, comprising the steps of:

generating a copy prevention signal;

encoding a digital video signal and the copy prevention signal into encoded digital data;

scrambling the encoded digital data;

transmitting the scrambled digital data;

descrambling the transmitted digital data;

detecting a condition that a copy prevention signal is included in the descrambled digital data; and generating, if the condition occurs, a signal to vary a recording pattern of the digital video signal according to the copy prevention signal.

17. A method of claim 16, wherein the step of generating a signal to vary a recording pattern includes the step of:

varying generation timing of a synchronous signal to vary the recording pattern.

18. A method of claim 16, wherein the step of generating a copy prevention signal includes the steps of:

generating a random number using a random number generator;

adding a predetermined value to the random number generated by the random number generator so as to generate the copy prevention signal.

19. A method of claim 18, wherein the step of generating a copy prevention signal further includes the steps of:

generating clock pulses, and counting the generated clock pulses for a predetermined period to generate the predetermined value.

20. A method for preventing copying of a digital broadcasting signal, comprising the steps of:

demodulating a digital broadcasting signal transmitted from a broadcasting station into a demodulated digital video signal, the digital broadcasting signal including no copy prevention signal;

descrambling the demodulated digital video signal;

expanding the descrambled digital video signal; and generating horizontal synchronous signals as a function of a predetermined number of pulses added to a random number, generated using a random number generator, so as to randomly vary a recording pattern of the descrambled digital video signal.

21. A method of claim 20, further comprising the steps of:

detecting a removal of the random number generator;

generating a control signal based on the detection; and stopping said descrambling according to the control signal.

22. A method of claim 20, wherein the step of generating horizontal synchronous signals further includes the steps of:

generating the predetermined number of pulses using a clock generator, and generating the horizontal synchronous signals in accordance with a number resulting from the addition of the predetermined number of pulses and the random number.

* * * * *